(12) United States Patent
Fam

(10) Patent No.: US 7,181,726 B2
(45) Date of Patent: Feb. 20, 2007

(54) METHOD FOR PROVIDING ACTIVE PROTECTION TO PROGRAMMING TOOLS FOR PROGRAMMABLE DEVICES

(75) Inventor: Swee-Koon Fam, Sandiago, CA (US)

(73) Assignee: BenQ Corporation, Tao-Yuan Hsien (TW)

(*) Notice: Subject to any disclaimer, the term of this patent is extended or adjusted under 35 U.S.C. 154(b) by 545 days.

(21) Appl. No.: 10/248,989

(22) Filed: Mar. 7, 2003

(65) Prior Publication Data
US 2004/0177341 A1    Sep. 9, 2004

(51) Int. Cl.
G06F 9/44 (2006.01)
(52) U.S. Cl. .................. 717/121; 717/174; 717/175; 717/177; 717/178
(58) Field of Classification Search ........ 717/148–178; 713/165–176; 705/74; 707/10
See application file for complete search history.

(56) References Cited

U.S. PATENT DOCUMENTS

| 6,016,476 | A | 1/2000 | Maes et al. | |
|---|---|---|---|---|
| 2002/0078353 | A1* | 6/2002 | Sandhu et al. | 713/170 |
| 2004/0073801 | A1* | 4/2004 | Kalogridis et al. | 713/176 |
| 2004/0117623 | A1* | 6/2004 | Kalogridis et al. | 713/165 |
| 2005/0102244 | A1* | 5/2005 | Dickinson et al. | 705/74 |
| 2005/0160095 | A1* | 7/2005 | Dick et al. | 707/10 |

FOREIGN PATENT DOCUMENTS

| CN | 1187646 A | 7/1998 |
|---|---|---|
| TW | 487839 | 5/2002 |

* cited by examiner

Primary Examiner—Meng-Al T. An
Assistant Examiner—Mark P. Francis
(74) Attorney, Agent, or Firm—Winston Hsu

(57) ABSTRACT

A method includes providing a programmable device, such as a mobile phone, having a plurality of operational modes and a key data, and providing a computer system having configuration data corresponding to the plurality of operational modes. An authorized portion of the configuration data corresponds to the key data and to at least one authorized operational mode of the mobile phone. The method further includes sending the key data from the mobile phone to the computer system over a data connection, then, activating the authorized configuration data at the computer system referencing the received key data, before finally, programming the mobile phone with the authorized configuration data through the data connection to enable a predetermined authorized operational mode. Protection from errors in programming and device cloning is insured, as the computer system is prevented from programming the mobile phone until receiving the key data from the mobile phone.

14 Claims, 3 Drawing Sheets

METHOD FOR PROVIDING ACTIVE PROTECTION TO PROGRAMMING TOOLS FOR PROGRAMMABLE DEVICES

BACKGROUND OF INVENTION

1. Field of the Invention

The present invention relates to digital electronics, and more specifically, to computer-based programming tools and software for handheld digital electronic devices.

2. Description of the Prior Art

Protecting computer software from misuse has been a concern since computers were first developed. One form of misuse, software piracy, normally only results in lost revenue for software developers and publishers, but can have more significant consequences. Software piracy and misuse has conventionally been fought with various protection schemes employing encryption or activation methods.

A typical software protection scheme validates a user password before enabling and executing a software application. This type of scheme is useful for database access where different users have different access rights. Another conventional protection scheme common with commercial software applications is a hardware key. Hardware keys can take the form of a CD being inserted into a CD drive for protecting a home-user application, or a specialized hardware lock (dongle) used for protecting high-end professional applications. Besides resulting in inconveniences to users, typical protection schemes are easily worked around and circumvented.

When applied to programming software used to program electronic devices, such as programming tools used by service providers to program mobile phones, typical software protection schemes offer few advantages. First, these schemes are easily defeated, and it can generally be assumed that any individual who desires to obtain such protected programming tools can obtain them and negate the protection scheme. Second, these schemes simply passively protect the software programming tools from access or unauthorized copying, and offer no further means of protecting against actual misuse while the programming tools are functioning. This is a particularly notable shortcoming in the case of mobile phone cloning.

Once a protection scheme for a set of programming tools has been defeated, programming a mobile phone is straightforward. Parameters can be sent to the phone indiscriminately. If these parameters contain errors, the mobile phone may operate incorrectly or even cease to operate. When these parameters are stolen or duplicated a mobile phone can be cloned. Thus, the capabilities of these programming tools need to be protected to safeguard the functionality of individual mobile phones and entire mobile phone networks.

Conventionally, programming tools for mobile phones or other electronic devices have been protected against unauthorized copying and use by conventional software protection schemes, such as the hardware key or password validation schemes. The disadvantages of these schemes require that an improved method be developed.

SUMMARY OF INVENTION

It is therefore a primary objective of the present invention to provide a method for providing active protection to programming tools for programmable devices to provide security, and further, to prevent errors in programming, accordingly solving the abovementioned problems of the prior art.

Briefly summarized, a method according to the present invention includes providing a programmable device having a plurality of operational modes and a key data, and providing a computer system having configuration data corresponding to the plurality of operational modes of the programmable device. An authorized portion of the configuration data corresponds to the key data and to at least one authorized operational mode. The method further includes, first, establishing a data connection between the computer system and the programmable device and sending the key data from the programmable device to the computer system over the data connection, then, activating the authorized configuration data at the computer system referencing the received key data, before finally, programming the programmable device with the authorized configuration data through the data connection to enable a predetermined authorized operational mode.

According to the present invention, the method can further include locking configuration data not corresponding to the key data at the computer system. Locked configuration data being unusable when programming the programmable device.

According to the present invention, the method can further include confirming the authorized configuration data by referencing the key data with the programmable device and rejecting configuration data received not corresponding to the key data before programming the programmable device with the authorized configuration data.

It is an advantage of the present invention that the programmable device supplies critical information, namely the key data, to the computer system. And, the computer system is unable to program the programmable device without this critical information.

It is a further advantage of the present invention that the key data includes limitations to how the programmable device can be programmed, in effect, reducing the probability that the programmable device is programmed erroneously or in an unauthorized manner.

It is a further advantage of the present invention that misuse of software embodying the method is prevented by information contained in a specific programmable device.

These and other objectives of the present invention will no doubt become obvious to those of ordinary skill in the art after reading the following detailed description of the preferred embodiment that is illustrated in the various figures and drawings.

DETAILED DESCRIPTION

The present invention is described in the following as applied to programming a mobile phone. The present invention can be applied to other programmable electronic devices as well.

Figure 1:
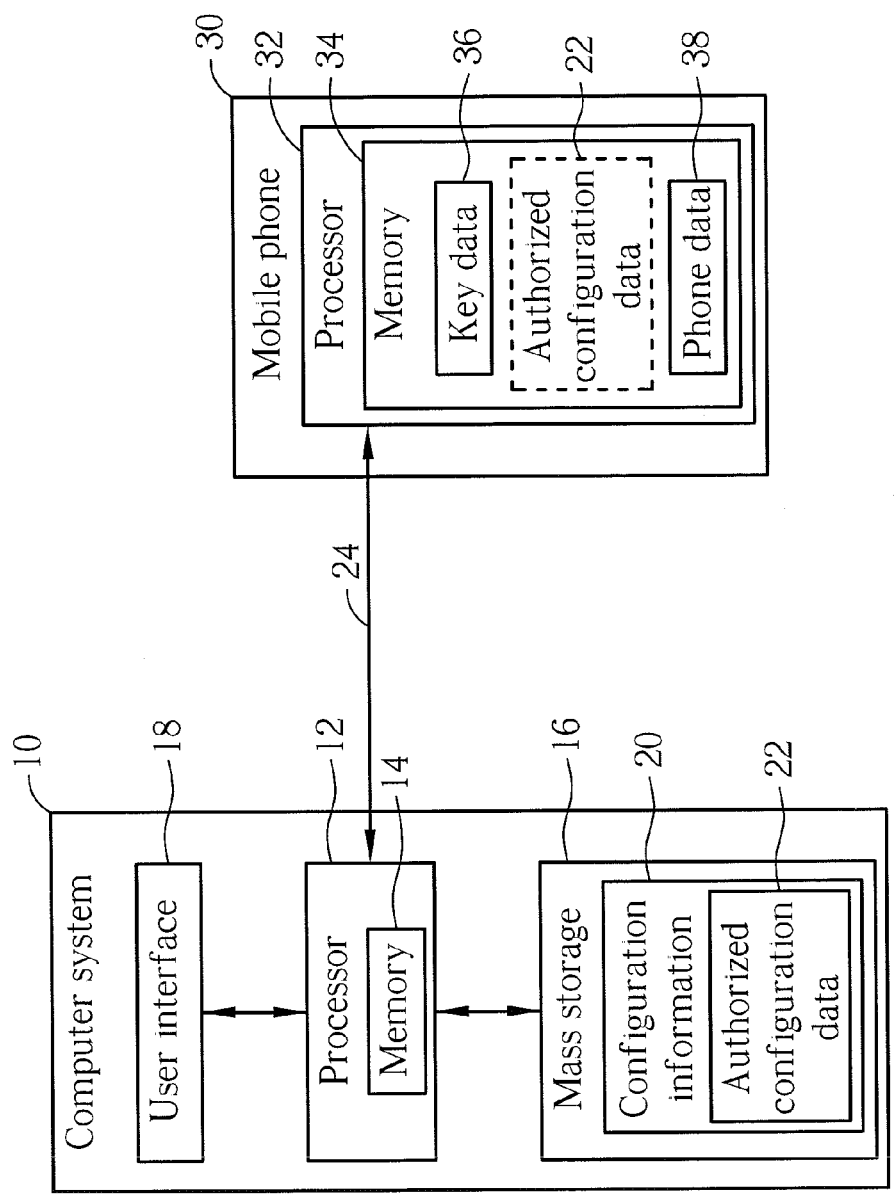
FIG. 1 is a schematic diagram of a computer system for programming a mobile phone according to the present invention.

Please refer to FIG. 1 showing a computer system 10 for programming a mobile phone 30. The computer system 10 includes a processor 12 and a memory 14, such as a random access memory, in a combination well known in the art. The computer further comprises a mass storage device 16, such as a hard drive, and a user interface 18 including a monitor, keyboard, pointing device, etc. A data cable 24, or similar data transmission device such as radio transmitters and receivers, connects the computer system 10 to the mobile phone 30. The mass storage device 16 stores configuration information 20 for the mobile phone 30.

The configuration information 20 includes operating data and parameters required for the mobile phone 30 to function such as mobile phone operating software, network information, service provider information, hardware settings, and other similar information for supporting a wide variety of mobile phones. The configuration information 20 can be in the form of discrete files, each for a distinct mobile phone model, serial number, or unique identification number, or can have a more generalized data structure. A user can modify or amend the configuration data 20 thought the user interface 18, however, the user cannot select and transmit configuration information to the phone 30. A portion of the configuration information 20, or a single file in the case of discrete files, is authorized (by a service provider, vendor, or manufacturer) for loading to the mobile phone 30, and is represented in FIG. 1 as authorized configuration data 22. The authorized configuration data 22 present in a memory of a mobile phone means the mobile phone is effectively programmed into a corresponding authorized operational mode. In practical application there is one set of authorized configuration data for each mobile phone to be programmed, only one authorized configuration data 22 being shown for clarity.

The mobile phone 30 includes a processor 32 and a memory 34. The memory 34 stores key data 36 and phone data 38, and is capable of storing authorized configuration data 22. The phone data 38 includes hardware information such as manufacturer ID, serial number, time and date from an internal clock of the processor 32, unique phone identification number, and other generally non-configurable information. The processor 32 acts on the authorized configuration data 22 stored in the memory 34 to realize the functions of the mobile phone 30. That is, the authorized configuration data 22 is essential to the operation of the mobile phone 30 and provides the authorized operational mode. For example, the authorized configuration data 22 can comprise a service provider identification number, so that the processor 32 can instruct related systems of the phone 30 to communicate with cellular base stations of the correct service provider. Before the phone 30 is programmed with the authorized configuration data 22, it is nonfunctional. When the mobile phone 30 is connected to the computer system 10 through the cable 24 and a data connection is established, the mobile phone 30 is ready to be programmed with the authorized configuration data 22.

Figure 2:
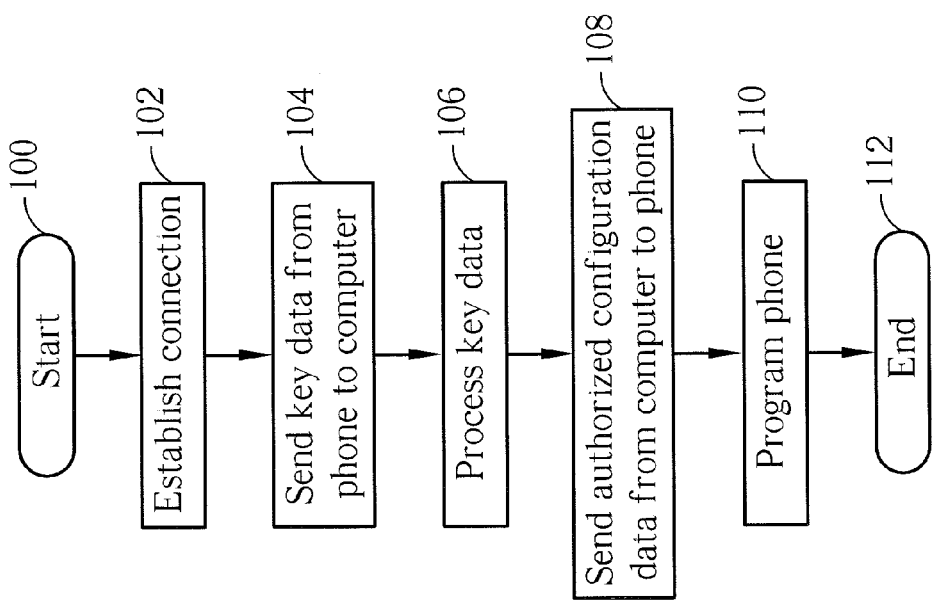
FIG. 2 is a flowchart of a method according to a first embodiment of the present invention.

Please refer to FIG. 2 showing a flowchart of a method according to a first embodiment of the present invention. The flowchart of FIG. 2 is described as follows with reference to FIG. 1.

Step 100: Start;

Step 102: Establish a data capable connection between the computer 10 and the mobile phone 30 through the connection cable 24. Once the cable 24 is connected, the processor 12 of the computer 10 initiates the connection with the processor 32 of the phone 30;

Step 104: The mobile phone 30, detecting the completion of the established connection, sends the key data 36 stored in the memory 34 to the computer 10;

Step 106: The computer 10 receives and processes the key data 36 correlating it to the configuration information 20 to determine the authorized configuration data 22;

Step 108: The computer 10 sends the authorized configuration data 22 to the mobile phone 30;

Step 110: The mobile phone 30 receives the authorized configuration data 22 and becomes programmed;

Step 112: End.

In this way, the above method as illustrated in FIG. 2 programs the mobile phone 30 with only a preauthorized configuration to realize a predetermined operational mode. The above method requires very little user interaction, and does not support a user directed transfer of configuration data to the mobile phone 30. Limited non-critical user interaction is allowed through the user interface 18. As a result, the mobile phone 30 is prevented from being given erroneous or prohibited configuration information, even though such information may be stored in the computer 10. Further programming can occur in step 110 according to other programming tools on the computer system 10, which unlocks these tools based on the key data 36 received.

Figure 3:
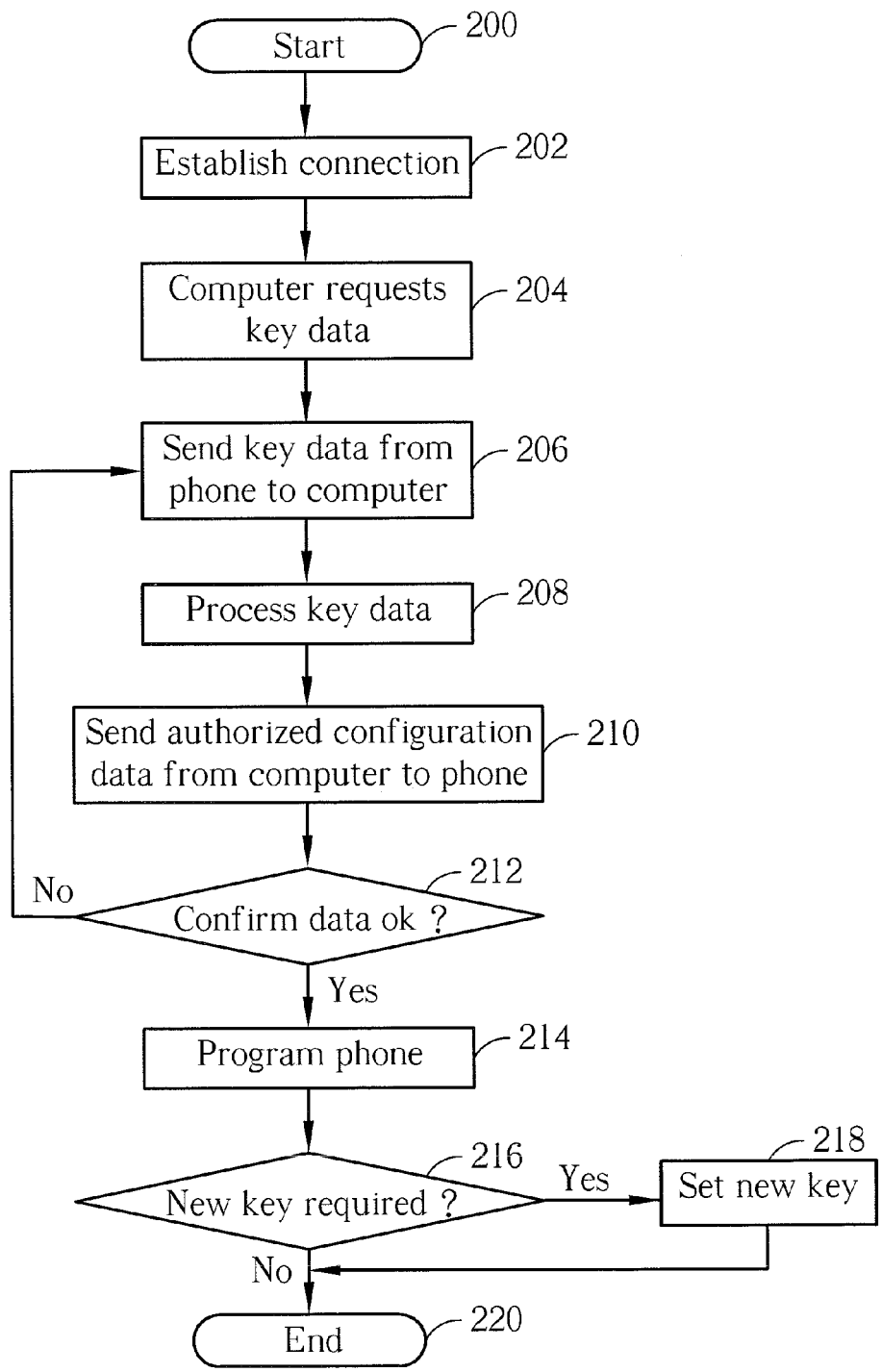
FIG. 3 is a flowchart of a method according to a second embodiment of the present invention.

Please refer to FIG. 3 showing a flowchart of a method according to a second embodiment of the present invention. The flowchart of FIG. 3 is described as follows with reference to FIG. 1.

Step 200: Start;

Step 202: Establish a data capable connection between the computer 10 and the mobile phone 30 through the connection cable 24. Once the cable 24 is connected, the processor 12 of the computer 10 initiates the connection with the processor 32 of the phone 30;

Step 204: The computer 10 sends a request to the mobile phone 30 for the key data 36;

Step 206: The mobile phone 30, receiving and verifying the request from the computer 10, sends the key data 36 stored in the memory 34 to the computer 10;

Step 208: The computer 10 receives and processes the key data 36 correlating it to the configuration information 20 to determine the authorized configuration data 22;

Step 210: The computer 10 sends the authorized configuration data 22 to the mobile phone 30;

Step 212: The mobile phone 30 receives the authorized configuration data 22 and compares it to expected data, effectively confirming the configuration data 22 using the key data 36. The mobile phone 30 rejects any data received that does not correspond to the key data 36. This provides another layer of protection and also verifies the success of the data transfer. If the configuration data 22 is confirmed as correct go to step 214, otherwise return to step 206;

Step 214: Upon confirming the received authorized configuration data 22, the mobile phone 30 becomes programmed;

Step 216: The processor 32 of the mobile phone 30 determines how many times the mobile phone 30 has been programmed. If the mobile phone 30 has been programmed more than a predetermined number of times, a new key data is required, go to step 218. If a new key is not required, go to step 220;

Step 218: The processor 32 of the mobile phone 30 generates a new key data from the phone data 38;

Step 220: End.

As described above, the method shown in FIG. 3 programs the mobile phone 30 with only a preauthorized configuration. The request step 204 allows for another layer of protection, via a password or similar well-known method. That is, the computer 10 is idle until a correct password is entered to initiate the programming of the mobile phone 30. The confirmation step 212 effectively confirms or verifies the configuration data 22 using the key data 36 as a reference. This can be accomplished, for instance, by including the key data 36 or a derivative of the key data 36 (such as a checksum) in the configuration data 22, and provides additional protection and verification of data transfer success. When the configuration data 22 is not properly confirmed, the mobile phone 30 resends the key data 36 to the computer 10. In steps 216 and 218, after the same key data is used to program the phone 30 a predetermined number of times, the phone 30 generates a new key data. The phone 30 generates this new key data using internal information, such as the phone data 38, in the same way the original key data 36 was determined. Alternatively, the computer 10 can keep track of the number of times the phone 30 has been programmed and prompt the phone 30 to generate a new key data accordingly. Regardless, the key data 36 and any new replacement key data should originate from the mobile phone 30 to ensure security. Furthermore, in step 214 additional programming can occur according to other programming tools on the computer system 10, the computer system 10 unlocking these tools after the key data 36 is received. The method illustrated in FIG. 3 accomplishes the same task as the method of FIG. 2 with enhanced protection.

In practical application, the present invention of protecting programming the tools of a programmable device such as a mobile phone can be realized with software and related hardware as illustrated in FIG. 1. The present invention is compatible with state of the art programming tools and programmable devices.

In contrast to the prior art, the present invention provides an active protection method for programming tools of programmable devices. A programmable device sends a key data to a computer system, which then unlocks corresponding configuration data (programming instructions) and sends this authorized configuration data to the programmable device. The computer system is incapable of programming the programmable device without receiving valid key data. Thus, the present invention method ensures that a programmable device cannot be programmed erroneously or in an unauthorized manner.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for providing protection to programming tools for programmable devices, the method comprising:
   providing a programmable device having a plurality of operational modes and a key data, and providing a computer system having configuration data corresponding to the plurality of operational modes of the programmable device, wherein an authorized portion of the configuration data corresponds to the key data and to at least one authorized operational mode;
   establishing a data connection between the computer system and the programmable device; sending the key data from the programmable device to the computer system over the data connection;
   locking configuration data, not corresponding to the key data at the computer system, wherein locked configuration data cannot be used to program the programmable device;
   activating the authorized configuration data at the computer system referencing the received key data; and
   programming the programmable device with the authorized configuration data through the data connection to enable a predetermined authorized operational mode.

2. The method of claim 1 further comprising requesting the key data from the programmable device with the computer system before transmitting the key data from the programmable device to the computer system.

3. The method of claim 1 further comprising confirming the authorized configuration data by referencing the key data with the programmable device and rejecting configuration data received not corresponding to the key data before programming the programmable device with the authorized configuration data.

4. The method of claim 1 wherein the programmable device is a mobile phone and the key data comprises a unique identification number of the mobile phone that differentiates the mobile phone from a multitude of other mobile phones.

5. The method of claim 1 wherein the programmable device has an internal clock and the key data comprises a time stamp generated with the internal clock.

6. The method of claim 1 wherein the key data comprises information identifying the predetermined authorized operational mode of the plurality of operational modes.

7. The method of claim 1 wherein the key data comprises information identifying a vendor or manufacturer of the programmable device.

8. The method of claim 1 further comprising counting a number of instances that the programmable device has been programmed with authorized configuration data, and storing the number of instances in the programmable device.

9. The method of claim 8 further comprising generating a replacement key data with the programmable device after the programmable device has been programmed with the authorized configuration data by the computer system when the number of instances that the programmable device has been programmed exceeds a predetermined number.

10. The method of claim 1 wherein the programmable device is a mobile phone comprising a memory for storing the key data and the authorized configuration data, and a processor for enabling the predetermined authorized operational mode.

11. The method of claim 1 wherein the computer system comprises a connection port for establishing the data connection; a processor and a memory for interpreting the key data, activating the authorized configuration data, and programming the programmable device; a mass storage device for storing the configuration data; and a user interface.

12. A method for providing protection to programming tools for programmable devices, the method comprising:
   providing a programmable device having a plurality of operational modes and a key data; providing a computer system having configuration data corresponding to the plurality of operational modes of the programmable device, wherein an authorized portion of the configuration data corresponds to the key data and to at least one authorized operational mode; establishing a data connection between the computer system and the programmable device; sending the key data from the programmable device to the computer system over the data connection;
   locking configuration data, not corresponding to the key data at the computer system wherein locked configuration data cannot be used to program the programmable device;
   activating the authorized configuration data at the computer system referencing the received key data; transmitting the authorized configuration data through the data connection from the computer system to the programmable device; the programmable device confirming the authorized configuration data by referencing the key data and rejecting received configuration data not corresponding to the key data before programming the programmable device with the authorized configuration data; and
   programming the programmable device with the authorized configuration data through the data connection to enable a predetermined authorized operational mode.

13. A method for providing protection to programming tools for programmable devices, the method comprising: providing a programmable device having a plurality of operational modes and a key data, and providing a computer system having configuration data corresponding to the plurality of operational modes of the programmable device, wherein an authorized portion of the configuration data corresponds to the key data and to at least one authorized operational mode;

establishing a data connection between the computer system and the programmable device;

locking configuration data, not corresponding to the key data at the computer system wherein locked configuration data cannot be used to program the programmable device;

sending the key data from the programmable device to the computer system over the data connection; activating the authorized configuration data at the computer system referencing the received key data; programming the programmable device with the authorized configuration data through the data connection to enable a predetermined authorized operational mode; and counting a number of instances that the programmable device has been programmed with authorized configuration data, and storing, the number of instances in the programmable device.

14. The method of claim 13 further comprising generating a replacement key data with the programmable device after the programmable device has been programmed with the authorized configuration data by the computer system when the number of instances that the programmable device has been programmed exceeds a predetermined number.

* * * * *